(12) United States Patent
Yamamoto

(10) Patent No.: US 10,768,465 B2
(45) Date of Patent: Sep. 8, 2020

(54) LIQUID CRYSTAL DISPLAY PANEL AND DISPLAY APPARATUS

(71) Applicant: Sharp Kabushiki Kaisha, Sakai, Osaka (JP)

(72) Inventor: Yoshinori Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/315,174

(22) PCT Filed: Jul. 13, 2017

(86) PCT No.: PCT/JP2017/025532
§ 371 (c)(1),
(2) Date: Jan. 4, 2019

(87) PCT Pub. No.: WO2018/012584
PCT Pub. Date: Jan. 18, 2018

(65) Prior Publication Data
US 2019/0310511 A1   Oct. 10, 2019

(30) Foreign Application Priority Data

Jul. 15, 2016   (JP) ................. 2016-140554

(51) Int. Cl.
*G02F 1/1335* (2006.01)
*G02F 1/13* (2006.01)
*G02B 5/30* (2006.01)

(52) U.S. Cl.
CPC ............. *G02F 1/1335* (2013.01); *G02B 5/30* (2013.01); *G02F 1/13* (2013.01); *G02F 1/133512* (2013.01); *G02F 1/133528* (2013.01); *G02F 2201/56* (2013.01)

(58) Field of Classification Search
CPC ......... G02F 1/133528; G02F 1/133512; G02F 1/133514; G02F 2201/56
See application file for complete search history.

(56) References Cited

U.S. PATENT DOCUMENTS

2016/0170246 A1   6/2016   Lu et al.
2019/0102758 A1*  4/2019   Wright ................ G06Q 20/382

FOREIGN PATENT DOCUMENTS

| JP | 10-90673 A | 4/1998 |
|---|---|---|
| JP | 2005-266284 A | 9/2005 |
| WO | 2007/108244 A1 | 9/2007 |

OTHER PUBLICATIONS

Official Communication issued in International Patent Application No. PCT/JP20171025532, dated Oct. 10, 2017.

* cited by examiner

*Primary Examiner* — Dung T Nguyen
(74) *Attorney, Agent, or Firm* — Keating & Bennett, LLP

(57) ABSTRACT

Obtained is a liquid crystal display panel that allows for a continued check on whether a polarizing plate is affixed at an appropriate position while retaining the design flexibility. In a liquid crystal display panel (10), two recess portions (BMa1) and two island portions (BMa2) are provided on an edge of a black matrix (BM), and two recess portions (3a) and two recess portions (4a) are provided on respective edges of a rear polarizing plate (3) and a front polarizing plate (4) at positions that match the two recess portions (BMa1) and the two island portions (BMa2).

6 Claims, 9 Drawing Sheets

LIQUID CRYSTAL DISPLAY PANEL AND DISPLAY APPARATUS

TECHNICAL FIELD

The present invention relates to a liquid crystal display panel having a black matrix and to a display apparatus.

BACKGROUND ART

Typically, a polarizing plate is used in a liquid crystal display panel. This polarizing plate needs to be affixed to an appropriate position on a substrate constituting the liquid crystal display panel.

According to PTL 1, a set of two slits, or cutout patterns, is formed at each of four corners of a black matrix outside a display portion. In addition, according to PTL 1, it can be determined that the polarizing plate is affixed at an appropriate position when only one of the slits in each set is covered by the polarizing plate, and it can be determined that the polarizing plate is not affixed at an appropriate position when both of the two slits in each set are covered by the polarizing plate or when neither of the two slits in each set is covered by the polarizing plate.

According to PTL 2, alignment marks are provided at two diagonal corners of a rectangular polarizing plate. When a polarizing plate constituting a liquid crystal display panel is to be affixed to a substrate, alignment marks for positioning are displayed within a display portion, and the polarizing plate is affixed so that the positions of the displayed alignment marks match the positions of the alignment marks provided on the polarizing plate. According to PTL 2, this configuration makes it possible to match the position and the orientation of the polarizing plate in the liquid crystal panel with high accuracy.

CITATION LIST

Patent Literature

PTL 1: Japanese Unexamined Patent Application Publication No. 10-90673 (published on Apr. 10, 1998)
PTL 2: Japanese Unexamined Patent Application Publication No. 2005-266284 (published on Sep. 29, 2005)

SUMMARY OF INVENTION

Technical Problem

However, according to PTL 1, whether the position where the polarizing plate is affixed is appropriate is determined on the basis of whether the sets of two slits provided at the four corners of the black matrix are covered by the polarizing plate. Therefore, the size of the black matrix must be greater than the size of the polarizing plate. In this manner, since there is a constraint on the sizes of the black matrix and the polarizing plate according to PTL 1, the design flexibility is reduced.

According to PTL 2, the alignment marks are formed on the polarizing plate. The alignment marks are typically formed on a laminate serving as a protection film affixed to the polarizing plate. The laminate is not a member constituting an end product and is thus peeled off the polarizing plate before the product is shipped out from the factory. In particular, since there is a case in which the alignment marks interfere with a display inspection, the laminate may be peeled off the polarizing plate before the display inspection.

In this manner, in a case in which the alignment marks are formed on the laminate, the positional deviation of the polarizing plate cannot be checked after the laminate has been peeled off.

The present invention has been made in view of the problems described above and is directed to obtaining a liquid crystal display panel that allows for a continued check on whether a polarizing plate is affixed at an appropriate position while retaining the design flexibility.

Solution to Problem

To solve the problem described above, a liquid crystal display panel according to an aspect of the present invention includes a black matrix that blocks light between pixels disposed in a matrix in an image display portion; and a pair of polarizing plates disposed on respective outer side surfaces of two substrates sandwiching the black matrix, wherein at least two first shape portions are provided on an edge of the black matrix, the at least two first shape portions each being a shape that includes a recess portion recessed from the edge or a projection portion projecting from the edge, wherein at least two second shape portions are provided in at least one of the pair of polarizing plates, the at least two second shape portions each being a shape that includes a recess portion recessed from an edge of the polarizing plate or a projection portion projecting from the edge, and wherein, as viewed in a plan view, one of the at least two first shape portions and one of the at least two second shape portions are disposed at positions that match each other, and another one of the at least two first shape portions and another one of the at least two second shape portions are disposed at positions that match each other.

Advantageous Effects of Invention

An aspect of the present invention provides an advantageous effect of obtaining a liquid crystal display panel that allows for a continued check on whether the polarizing plate is affixed at an appropriate position while retaining the design flexibility.

DESCRIPTION OF EMBODIMENTS

First Embodiment

Configuration of Display Apparatus 1

Figure 3:
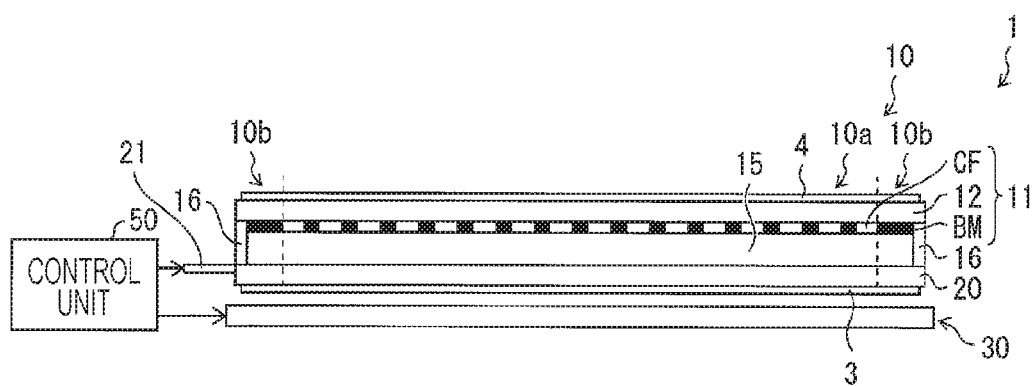
FIG. 3 is a sectional view illustrating a configuration of the display apparatus according to the first embodiment of the present invention.
Figure 4:
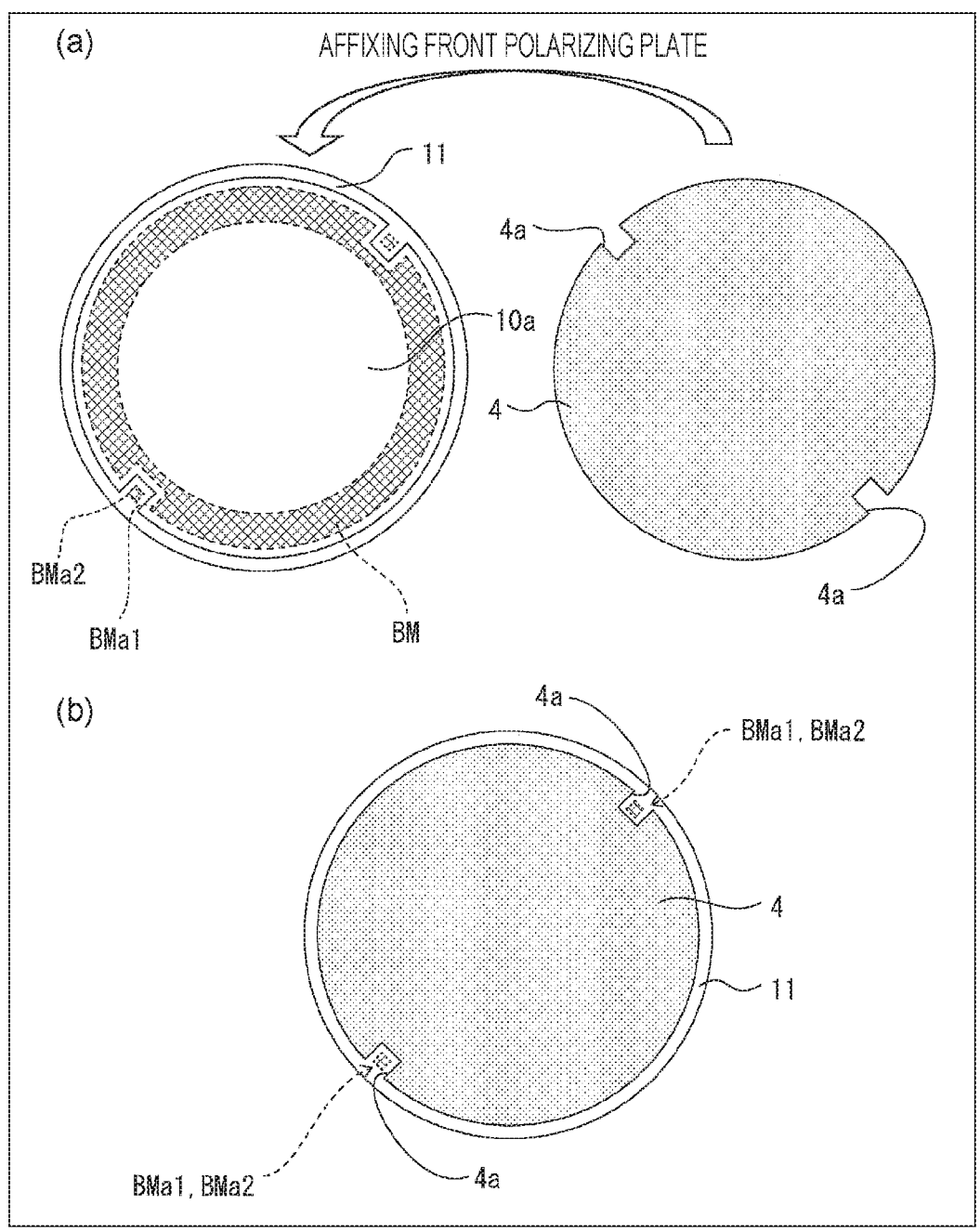
FIG. 4(a) illustrates a state in which the front polarizing plate is being affixed to a counter substrate of the liquid crystal display panel.
FIG. 4(b) illustrates a state obtained after the front polarizing plate has been affixed to the counter substrate.
Figure 5:
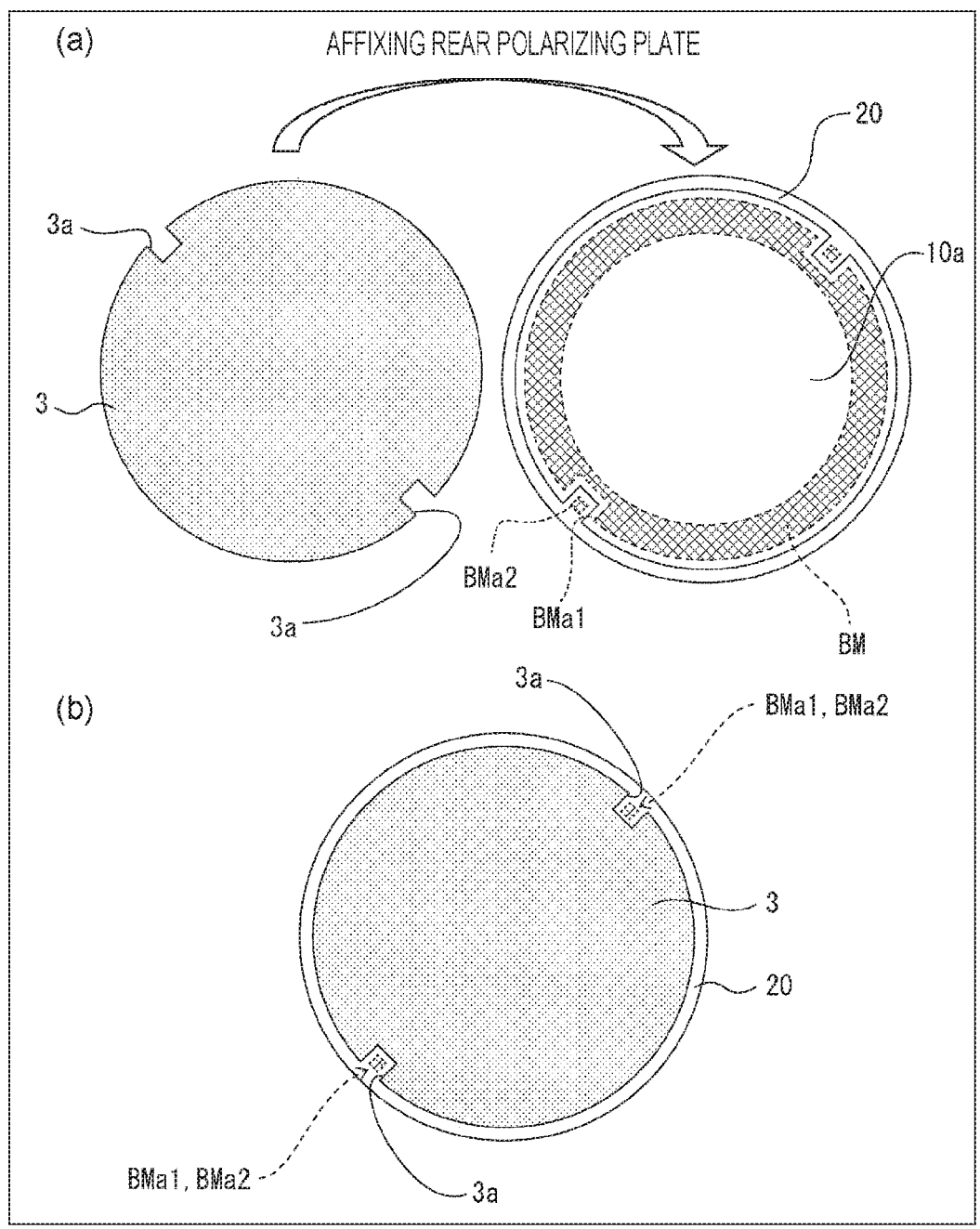
FIG. 5(a) illustrates a state in which a rear polarizing plate is being affixed to a device substrate of the liquid crystal display panel.
FIG. 5(b) illustrates a state obtained after the rear polarizing plate has been affixed to the device substrate.

First, a configuration of a display apparatus 1 will be described with reference to FIG. 3. FIG. 3 is a sectional view illustrating a configuration of the display apparatus 1 according to a first embodiment of the present invention.

The display apparatus 1 includes a liquid crystal display panel 10, a cable 21, a backlight (illumination unit) 30, and a control unit 50.

The liquid crystal display panel 10 includes a device substrate 20 and a counter substrate 11 that are affixed to each other with a seal 16; a liquid crystal 15 encapsulated in a space between the device substrate 20 and the counter substrate 11; and a rear polarizing plate 3 and a front polarizing plate 4 constituting a pair of polarizing plates. The device substrate 20 includes a glass substrate, a switching element for switching the on/off of pixels serving as liquid crystal shutters disposed in a matrix on the glass substrate, a pixel electrode, and an alignment film.

Of the liquid crystal display panel 10, a region where the pixels are disposed in a matrix to display an image is referred to as a display portion (image display portion) 10a, and a region surrounding the display portion 10a where no image is displayed is referred to a peripheral portion 10b.

In addition, of the liquid crystal display panel 10, a side where the backlight 30 is disposed may be referred to as a rear surface side, and its opposite side (the side on which a user sees a displayed image) may be referred to as a front surface side.

The counter substrate 11 includes a glass substrate 12, a color filter CF, a black matrix BM, a common electrode, and an alignment film.

The color filter CF and the black matrix BM are disposed on the surface of the glass substrate 12 that opposes the device substrate 20.

The color filter CF is a filter that transmits light in specific colors, such as red, green, and blue. The color filter CF is provided in a matrix within the display portion 10a on one of the two surfaces of the glass substrate 12 that opposes the device substrate 20.

The black matrix BM blocks light illuminated from the backlight 30. The black matrix BM is interposed between the glass substrate 12 and the device substrate 20. The black matrix BM is provided within the color filter CF and in the peripheral portion 10b, or the region outside the display portion 10a. The black matrix BM is provided in a lattice pattern within the color filter CF in the display portion 10a and provided in the peripheral portion 10b so as to enclose the display portion 10a. Thus, the black matrix BM blocks the light illuminated from the backlight 30 in the peripheral portion 10b and at portions between the pixels provided in the display portion 10a. As will be described later with reference to FIG. 1 and FIG. 2, the black matrix BM includes, on an edge thereof, first shape portions each composed of a recess portion BMa1 and an island portion BMa2 for determining the position and the orientation in which the rear polarizing plate 3 and the front polarizing plate 4 are affixed.

The rear polarizing plate 3 is affixed to the device substrate 20 on the surface opposite to the surface that opposes the counter substrate 11 (i.e., the surface opposing the backlight 30). The front polarizing plate 4 is affixed to the counter substrate 11 on the surface opposite to the surface that opposes the device substrate 20. As will be described later with reference to FIG. 1 and FIG. 2, the rear polarizing plate 3 and the front polarizing plate 4 include, on respective edge portions thereof, second shape portions constituted by recess portions 3a and 4a, respectively, for determining the affixing positions and orientations.

The cable 21 electrically connects various wires and circuit provided in the liquid crystal display panel 10 to the control unit 50. For example, an FPC (Flexible Printed Circuit) or the like can be used as the cable 21.

The backlight 30 is an illumination device that illuminates the liquid crystal display panel 10 in accordance with an instruction from the control unit 50. The backlight 30 is disposed to oppose the device substrate 20 with the rear polarizing plate 3 interposed therebetween.

The control unit 50 outputs display data for displaying an image on the liquid crystal display panel 10 or outputs a control signal to each light source included in the backlight 30, and thus the control unit 50 controls the driving of each of the liquid crystal display panel 10 and the backlight 30.

First Shape Portion and Second Shape Portion

With reference to FIG. 1, FIG. 2, FIG. 4, and FIG. 5, the first shape portions provided on the edge of the black matrix BM and the second shape portions provided in the rear polarizing plate 3 and the front polarizing plate 4 will be described.

Figure 1:
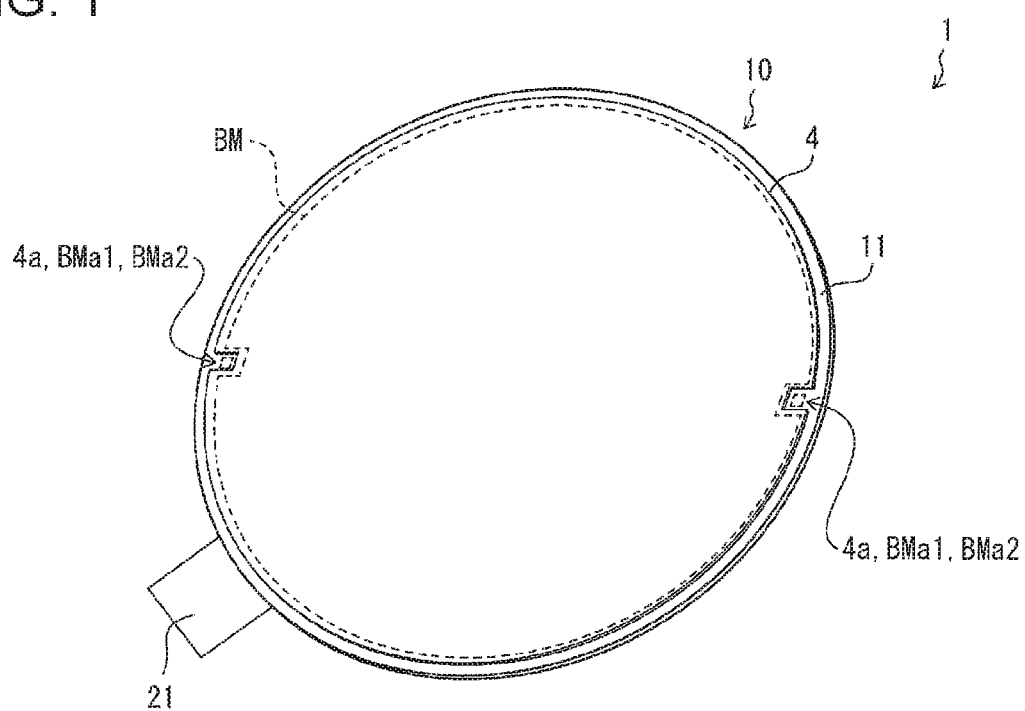
FIG. 1 is a perspective view illustrating an appearance of a liquid crystal display panel in a display apparatus according to a first embodiment of the present invention.
Figure 2:
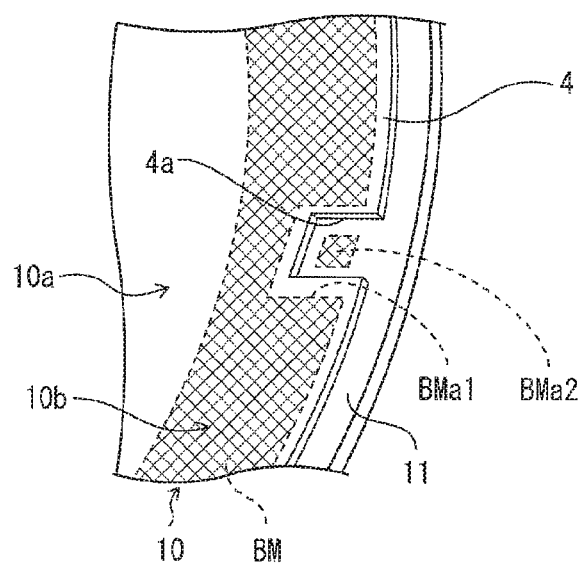
FIG. 2 illustrates, of FIG. 1, a configuration of a front polarizing plate in the vicinity of a recess portion.

FIG. 1 is a perspective view illustrating an appearance of the liquid crystal display panel 10 in the display apparatus 1 according to the first embodiment of the present invention. FIG. 2 illustrates, of FIG. 1, a configuration of the front polarizing plate 4 in the vicinity of the recess portion 4a. While FIG. 1 and FIG. 2 are illustrations of the liquid crystal display panel 10 as viewed from the front surface side, the shape of the black matrix BM is the same even when the liquid crystal display panel 10 is viewed from the rear surface side, and the shape of the rear polarizing plate 3 is the same as the shape of the front polarizing plate 4. In FIG. 2, the illustration of the black matrix BM formed in a lattice pattern in the display portion 10a is omitted.

In the present embodiment, the liquid crystal display panel 10 has a disc shape. Specifically, the counter substrate 11 and the device substrate 20 are each disc-shaped.

The black matrix BM includes, at two locations on the edge, the first shape portions for positioning the front polarizing plate 4 and the rear polarizing plate 3, and each first shape portion is composed of a recess portion BMa1 and an island portion BMa2. The black matrix BM has a circular edge except at the first shape portions. The recess portion BMa1 has a shape recessed toward the center from the edge of the black matrix BM. The island portion BMa2 is spaced apart from the recess portion BMa1 and surrounded at three sides by the recess portion BMa1.

The recess portion BMa1 and the island portion BMa2 can be pattern-formed in the process of pattern-forming the black matrix BM included in the display portion 10a into a lattice pattern.

The front polarizing plate 4 includes, at two locations on the edge, the second shape portions for positioning when the front polarizing plate 4 is affixed to the counter substrate 11, and the second shape portions are each constituted by a recess portion 4a. The front polarizing plate 4 has a circular edge except at the second shape portions. The recess portion 4a has a shape recessed toward the center from the edge of the front polarizing plate 4.

The front polarizing plate 4 is affixed to the counter substrate 11 such that one of the two recess portions 4a matches one of the two recess portions BMa1 and one of the two island portions BMa2 provided in the black matrix BM and the other one of the two recess portions 4a matches the other one of the two recess portions BMa1 and the other one of the two island portions BMa2 provided in the black matrix BM. In this manner, the front polarizing plate 4 includes the recess portions 4a provided at two locations on the edge and recessed from the edge. In addition, the recess portions 4a provided at two locations on the edge of the front polarizing plate 4 are provided at positions corresponding to the recess portions BMa1 and the island portions BMa2 provided in the black matrix BM.

FIG. 4(a) illustrates a state in which the front polarizing plate 4 is being affixed to the counter substrate 11 of the liquid crystal display panel 10, and FIG. 4(b) illustrates a state obtained after the front polarizing plate 4 has been affixed to the counter substrate 11.

As illustrated in FIGS. 4(a) and 4(b), the two recess portions 4a are provided on the edge of the front polarizing plate 4 so as to correspond to the positions of the two recess portions BMa1 and the two island portions BMa2 in the black matrix BM. Therefore, the front polarizing plate 4 can be affixed to the counter substrate 11 with the position and the orientation of the front polarizing plate 4 set accurately.

FIG. 5(a) illustrates a state in which the rear polarizing plate 3 is being affixed to the device substrate 20 of the liquid crystal display panel 10, and FIG. 5(b) illustrates a state obtained after the rear polarizing plate 3 has been affixed to the device substrate 20.

As illustrated in FIGS. 5(a) and 5(b), as in the front polarizing plate 4, on the edge of the rear polarizing plate 3, one of the two recess portions 3a is provided to correspond to the positions of one of the two recess portions BMa1 and one of the two island portions BMa2 in the black matrix BM, and the other one of the two recess portions 3a is provided to correspond to the positions of the other one of the recess portions BMa1 and the other one of the two island portions BMa2 in the black matrix BM. Therefore, the rear polarizing plate 3 can be affixed to the device substrate 20 with the position and the orientation of the rear polarizing plate 3 set accurately.

Figure 6:
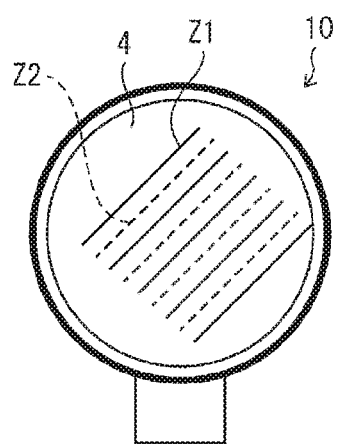
FIG. 6 illustrates a polarization axis of a liquid crystal and a polarization axis of the front polarizing plate in the liquid crystal display panel according to the first embodiment of the present invention.

FIG. 6 illustrates a polarization axis Z1 of the liquid crystal 15 and a polarization axis Z2 of the front polarizing plate 4 in the liquid crystal display panel 10.

As illustrated in FIG. 6, in the liquid crystal display panel 10, the front polarizing plate 4 can be affixed to the counter substrate 11 or the rear polarizing plate 3 can be affixed to the device substrate 20 such that the polarization axis Z1 of the liquid crystal 15 is accurately parallel to the polarization axis Z2 of the front polarizing plate 4 (or the polarization axis of the rear polarizing plate 3). Therefore, an occurrence of a decrease in the optical performance that could arise if the polarization axis Z1 of the liquid crystal 15 is nonparallel to the polarization axis Z2 of the front polarizing plate 4 (or the polarization axis of the rear polarizing plate 3) can be prevented.

Figure 7:
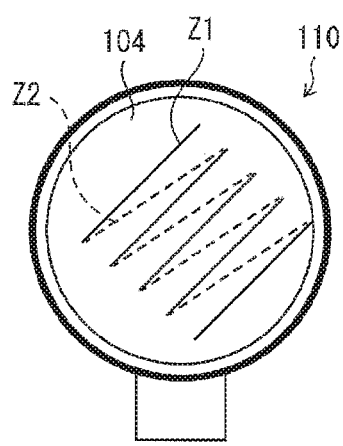
FIG. 7 illustrates a polarization axis of a liquid crystal and a polarization axis of a front polarizing plate in a liquid crystal display panel according to a first comparative example.

FIG. 7 illustrates a polarization axis Z1 of a liquid crystal and a polarization axis Z2 of a front polarizing plate 104 in a liquid crystal display panel 110 in which no recess portion or projection portion for positioning is provided in any of a black matrix, the front polarizing plate 104, and a rear polarizing plate.

In the liquid crystal display panel 110 illustrated in FIG. 7, the edge of the black matrix, the front polarizing plate 104, and the rear polarizing plate are circular. Therefore, unlike the case in which a front polarizing plate and a rear polarizing plate are rectangular, neither the front polarizing plate 104 nor the rear polarizing plate has a straight linear edge that allows the orientations thereof to be checked.

Therefore, in the liquid crystal display panel 110, it is difficult to affix the front polarizing plate 104 to a counter substrate or to affix the rear polarizing plate to a device substrate such that the polarization axis Z2 of the front polarizing plate 104 (or the polarization axis of the rear polarizing plate) is accurately parallel to the polarization axis Z1 of the liquid crystal 15.

As a result, the polarization axis Z1 of the liquid crystal 15 becomes nonparallel to the polarization axis Z2 of the front polarizing plate 104 (or the polarization axis of the rear polarizing plate 3), which results in a decrease in the optical performance.

In addition, it is also difficult to check whether the polarization axis Z2 of the front polarizing plate 104 (or the polarization axis of the rear polarizing plate) is nonparallel to the polarization axis Z1 of the liquid crystal 15 after the front polarizing plate 104 has been affixed to the counter substrate or after the rear polarizing plate has been affixed to the device substrate. Accordingly, the state in which the optical performance is being reduced is retained without being corrected.

Figure 8:
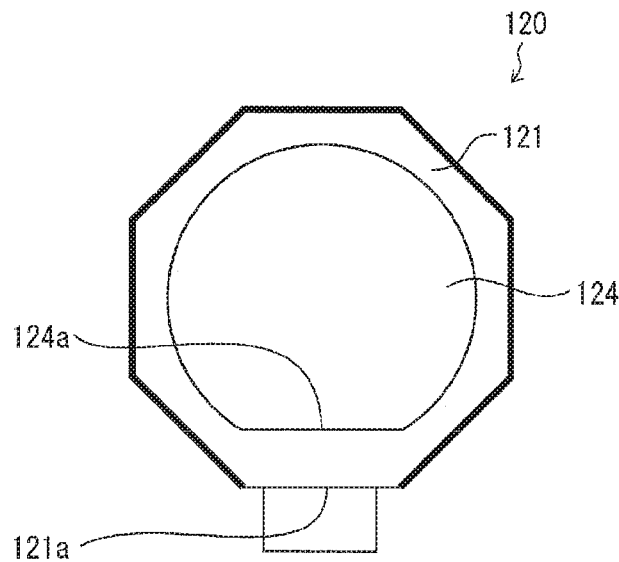
FIG. 8 illustrates a configuration of a liquid crystal display panel according to a second comparative example.

FIG. 8 illustrates a configuration of an octagonal liquid crystal display panel 120. A counter substrate 121 constituting the liquid crystal display panel 120 and a device substrate disposed to oppose the counter substrate 121 are each octagonal. A front polarizing plate 124 affixed to the counter substrate 121 has a generally circular edge with a part of the edge constituted by a linear portion 124a. No recess portion or projection portion for positioning is provided in any of a black matrix, the front polarizing plate 124, and a rear polarizing plate provided in the liquid crystal display panel 120.

In the liquid crystal display panel 120, whether the orientation of the front polarizing plate 124 is appropriate can be checked by checking whether the linear portion 124a on the edge of the front polarizing plate 124 is parallel to a linear side 121a of the counter substrate 121 that opposes the linear portion 124a.

Figure 9:
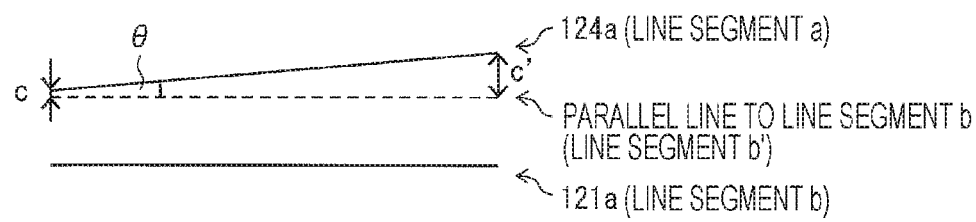
FIG. 9 illustrates a relationship between a linear portion on an edge of a front polarizing plate and one side of a counter substrate in the liquid crystal display panel according to the second comparative example.

FIG. 9 illustrates a relationship between the linear portion 124a on the edge of the front polarizing plate 124 and one side of the counter substrate 121 in the liquid crystal display panel 120.

As illustrated in FIG. 9, the side 121a is regarded as a line segment b, a straight line parallel to the line segment b is regarded as a line segment b', and the linear portion 124a is regarded as a line segment a. In addition, the length of a straight line extending from one end portion of the line segment a and perpendicularly intersecting the line segment b' is denoted by c, and the length of a straight line extending from the other end portion of the line segment a and perpendicularly intersecting the line segment b' is denoted by c'. Then, an angle θ formed by the line segment a and the line segment b' can be expressed as follows.

$$\theta = \tan^{-1}(|c-c'|/b') = \cos^{-1}(b'/a) = \sin^{-1}(|c-c'|/a)$$

In this manner, θ can be calculated by measuring the line segment a, the line segment b', and length c, and the length c'.

However, when a liquid crystal display panel is a pentagon or a higher-order polygon, the length of each side decreases. In this manner, a decrease in the length of each side leads to an increase in the measurement error. Therefore, when a liquid crystal display panel is a pentagon or a higher-order polygon, whether the orientation of the polarizing plate is appropriate cannot be grasped accurately through the method of calculating θ by measuring the line segment a, the line segment b', the length c, and the length c' as described above.

Meanwhile, in the liquid crystal display panel 10 illustrated in FIG. 1 to FIG. 5, the two recess portions BMa1 recessed from the edge and the two island portions BMa2 are provided on the edge of the black matrix BM as viewed in a plan view. In addition, the two recess portions 3a recessed from the edge are provided on the edge of the rear polarizing plate 3 to be affixed to the device substrate 20. Furthermore, the two recess portions 4a recessed from the edge are provided on the edge of the front polarizing plate 4 to be affixed to the glass substrate 12.

One of the two recess portions BMa1 and one of the two island portions BMa2 are disposed at the positions that match the position of one of the two recess portions 3a, and the other one of the two recess portions BMa1 and the other one of the two island portions BMa2 are disposed at the positions that match the position of the other one of the two recess portions 3a.

Furthermore, one of the two recess portions BMa1 and one of the two island portions BMa2 are disposed at the positions that match the position of one of the two recess portions 4a, and the other one of the two recess portions BMa1 and the other one of the two island portions BMa2 are disposed at the positions that match the position of the other one of the two recess portions 4a.

In this manner, although the liquid crystal display panel 10 is disc-shaped, it suffices that the rear polarizing plate 3 be affixed to the device substrate 20 such that the two recess portions BMa1 and the two island portions BMa2 provided on the edge of the black matrix BM match the recess portions 3a provided on the edge of the rear polarizing plate 3, and the rear polarizing plate 3 can be affixed accurately in appropriate position and orientation.

In a similar manner, it suffices that the front polarizing plate 4 be affixed to the glass substrate 12 such that the two recess portions BMa1 and the two island portions BMa2 provided on the edge of the black matrix BM match the recess portions 4a provided on the edge of the front polarizing plate 4, and the front polarizing plate 4 can be affixed accurately in appropriate position and orientation.

Furthermore, to check whether the position, the orientation, and so on in which the rear polarizing plate 3 is being affixed to the device substrate 20 are appropriate after the rear polarizing plate 3 has been affixed to the device substrate 20, it suffices to check whether the positions of the recess portions BMa1 and the island portions BMa2 present as shapes on the edge of the black matrix BM match the positions of the recess portions 3a present as shapes on the edge of the rear polarizing plate 3.

In a similar manner, to check whether the position, the orientation, and so on in which the front polarizing plate 4 is being affixed to the glass substrate 12 are appropriate after the front polarizing plate 4 has been affixed to the glass substrate 12, it suffices to check whether the positions of the recess portions BMa1 and the island portions BMa2 in the black matrix BM match the positions of the recess portions 4a present as shapes on the edge of the front polarizing plate 4.

Accordingly, unlike the case in which an alignment mark is provided on a laminate that is to be peeled off after the polarizing plate is affixed to the substrate as described in PTL 2, whether the position, the orientation, and so on in which the rear polarizing plate 3 is being affixed to the device substrate 20 are appropriate or whether the position, the orientation, and so on in which the front polarizing plate 4 is being affixed to the glass substrate 12 are appropriate can continue to be checked even after the rear polarizing plate 3 has been affixed to the device substrate 20 or even after the front polarizing plate 4 has been affixed to the glass substrate 12.

In addition, it suffices that the rear polarizing plate 3 be affixed to the device substrate 20 such that the positions of the two recess portions BMa1 and the two island portions BMa2 provided on the edge of the black matrix BM match the positions of the two recess portions 3a provided on the edge of the rear polarizing plate 3, and the rear polarizing plate 3 can be affixed accurately in appropriate position and orientation.

In a similar manner, it suffices that the front polarizing plate 4 be affixed to the glass substrate 12 such that the positions of the two recess portions BMa1 and the two island portions BMa2 provided on the edge of the black matrix BM match the positions of the two recess portions 4a provided on the edge of the front polarizing plate 4, and the front polarizing plate 4 can be affixed accurately in appropriate position and orientation.

Accordingly, a decrease in the optical performance that could arise if the orientations of the rear polarizing plate 3 and the front polarizing plate 4 are not appropriate can be prevented.

Furthermore, it suffices that whether the positions of the two recess portions BMa1 and the two island portions BMa2 match the positions of the two recess portions 3a and the positions of the two recess portions 4a can be checked, and whichever of the size of the black matrix BM and the size of the rear polarizing plate 3 and the front polarizing plate 4 can be greater. In other words, there is no such constraint in which the size of the black matrix must be greater than the size of the polarizing plate as described in PTL 1. Accordingly, a decrease in the design flexibility can be prevented.

In the present embodiment, the size of the front polarizing plate 4 is greater than the size of the black matrix BM (see FIG. 2). In addition, the size of the rear polarizing plate 3 is greater than the size of the black matrix BM. However, as described above, this is not a limiting example, and the size of the front polarizing plate 4 and the rear polarizing plate 3 may be the same as the size of the black matrix BM, or the size of the black matrix BM may be greater than the size of the front polarizing plate 4 and the rear polarizing plate 3.

Aside from being disc-shaped, the liquid crystal display panel 10 may be in a variety of shapes including a triangle, a rectangle, a pentagon, and a higher-order polygon.

In the liquid crystal display panel 10, the two recess portions BMa1 and the two island portions BMa2 provided on the edge of the black matrix BM, the two recess portions 3a provided on the edge of the rear polarizing plate 3, and the two recess portions 4a provided on the edge of the front polarizing plate 4 are provided in the peripheral portion 10b that is a region outside the display portion 10a and in which no image is displayed. Therefore, a decrease in the image quality that could arise due to the two recess portions BMa1, the two island portions BMa2, the two recess portions 3a, and the two recess portions 4a can be prevented.

The two recess portions BMa1 and the two island portions BMa2 provided on the edge of the black matrix BM are disposed symmetric about the center of the black matrix BM. In other words, one recess portion BMa1, one island portion BMa2, the center of the black matrix BM, the other recess portion BMa1, and the other island portion BMa2 are arrayed linearly.

The two recess portions 3a provided on the edge of the rear polarizing plate 3 are disposed symmetric about the center of the rear polarizing plate 3. In other words, one recess portion 3a, the center of the rear polarizing plate 3, and the other recess portion 3a are arrayed linearly.

The rear polarizing plate 3 can be easily affixed to the device substrate 20 such that the positions of the two recess portions BMa1 and the two island portions BMa2 match the positions of the two recess portions 3a. Therefore, the rear polarizing plate 3 can be affixed to the device substrate 20 more accurately in an appropriate orientation.

Furthermore, the two recess portions 4a provided on the edge of the front polarizing plate 4 are disposed symmetric about the center of the front polarizing plate 4. In other words, one recess portion 4a, the center of the front polarizing plate 4, and the other recess portion 4a are arrayed linearly.

Therefore, the front polarizing plate 4 can be easily affixed to the glass substrate 12 such that the positions of the two recess portions BMa1 and the two island portions BMa2 match the positions of the two recess portions 4a. Therefore, the front polarizing plate 4 can be affixed to the glass substrate 12 more accurately in an appropriate orientation.

The arrangement of the two recess portions BMa1 and the two island portion BMa2 in the black matrix BM, the arrangement of the two recess portions 3a in the rear polarizing plate 3, and the arrangement of the two recess portions 4a in the front polarizing plate 4 are each not limited to the symmetric arrangement with respect to the center.

In addition, the number of the recess portions BMa1 and the island portions BMa2 provided on the edge of the black matrix BM, the number of the recess portions 3a provided on the edge of the rear polarizing plate 3, and the number of the recess portions 4a provided on the edge of the front polarizing plate 4 are each not limited to two and may be three or more. Furthermore, the shape of each of the above is not limited to a recess and may be a projection projecting from the edge or may be a circular arc, a triangle, a rectangle, a pentagon, a higher-order polygon, and so on.

Second Embodiment

A second embodiment of the present invention will be described as follows with reference to FIG. 10. To simplify the description, members having functions identical to those of the members described in the first embodiment above are given identical reference characters, and descriptions thereof will be omitted.

Figure 10:
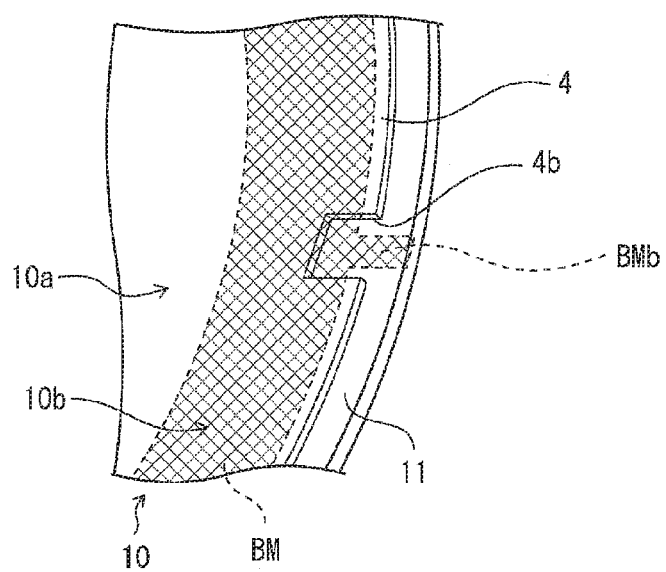
FIG. 10 illustrates a configuration of a front polarizing plate in the vicinity of a recess portion in a liquid crystal display panel according to a second embodiment of the present invention.

FIG. 10 illustrates a configuration of a front polarizing plate 4 in the vicinity of a recess portion 4a in a liquid crystal display panel 10 according to the second embodiment of the present invention. As illustrated in FIG. 10, a black matrix BM may include two projection portions BMb projecting from an edge as viewed in a plan view, in place of the two recess portions BMa1 recessed from the edge and the two island portions BMa2 (see FIG. 2).

Thus, the front polarizing plate 4 is affixed to a counter substrate 11 such that the positions of the two recess portions 4b provided on the edge of the front polarizing plate 4 match the positions of the two projection portions BMb provided on the edge of the black matrix BM. In this manner, the front polarizing plate 4 can be affixed to the counter substrate 11 in optimal orientation and position.

In addition, although the illustration is omitted, a rear polarizing plate 3 is affixed to a device substrate 20 such that the positions of two recess portions 3b provided on an edge of the rear polarizing plate 3 match the positions of the two projection portions BMb provided on the edge of the black matrix BM. In this manner, the rear polarizing plate 3 can be affixed to the device substrate 20 in optimal orientation and position.

Third Embodiment

A third embodiment of the present invention will be described as follows with reference to FIG. 11. To simplify the description, members having functions identical to those of the members described in the first and second embodiments above are given identical reference characters, and descriptions thereof will be omitted.

Figure 11:
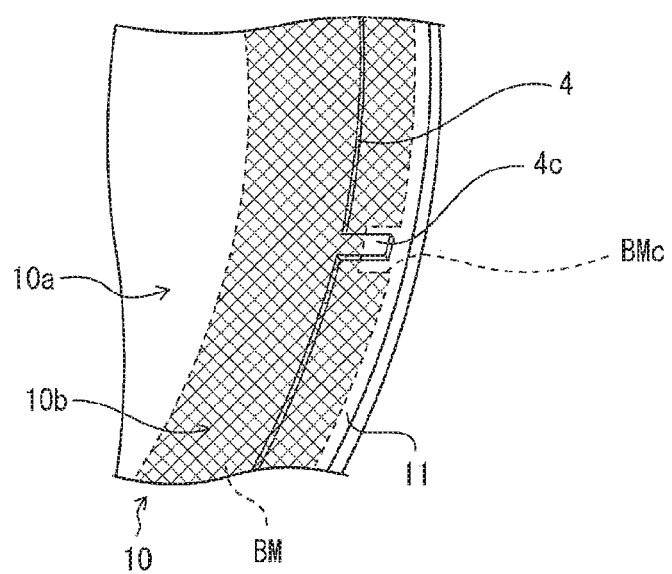
FIG. 11 illustrates a configuration of a front polarizing plate in the vicinity of a projection portion in a liquid crystal display panel according to a third embodiment of the present invention.

FIG. 11 illustrates a configuration of a front polarizing plate 4 in the vicinity of a projection portion 4c in a liquid crystal display panel 10 according to the third embodiment of the present invention. As illustrated in FIG. 11, the front polarizing plate 4 may include two projection portions 4c projecting from the edge as viewed in a plan view, in place of the two recess portions 4a (see FIG. 2). In addition, a black matrix BM may include two recess portions BMc recessed from the edge as viewed in a plan view, in place of the recess portions BMa1 recessed from the edge and the island portions BMa2 (see FIG. 2).

Thus, the front polarizing plate 4 is affixed to a counter substrate 11 such that the positions of the two projection portions 4c provided on the edge of the front polarizing plate 4 match the positions of the two recess portions BMc provided on the edge of the black matrix BM. In this manner, the front polarizing plate 4 can be affixed to the counter substrate 11 in optimal orientation and position.

In addition, although the illustration is omitted, a rear polarizing plate 3 may similarly include two projection portions projecting from the edge as viewed in a plan view, in place of the two recess portions 3a (see FIG. 2).

Thus, the rear polarizing plate 3 is affixed to a device substrate 20 such that the positions of the two projection portions provided on the edge of the rear polarizing plate 3 match the positions of the two recess portions BMc provided on the edge of the black matrix BM. In this manner, the rear polarizing plate 3 can be affixed to the device substrate 20 in optimal orientation and position.

In the present embodiment, the size of the black matrix BM is greater than the size of the front polarizing plate 4 and the rear polarizing plate 3. The size of the black matrix BM, however, may be smaller than the size of the front polarizing plate 4 and the rear polarizing plate 3.

Fourth Embodiment

A fourth embodiment of the present invention will be described as follows with reference to FIG. 12 and FIG. 13. To simplify the description, members having functions identical to those of the members described in the first to third embodiments above are given identical reference characters, and descriptions thereof will be omitted.

FIG. 12(a) illustrates a state in which a rear polarizing plate 3 according to the fourth embodiment of the present invention is being affixed to a device substrate 20 of a liquid crystal display panel 10, and FIG. 12(b) illustrates a state obtained after the rear polarizing plate 3 has been affixed to the device substrate 20.

Figure 12:
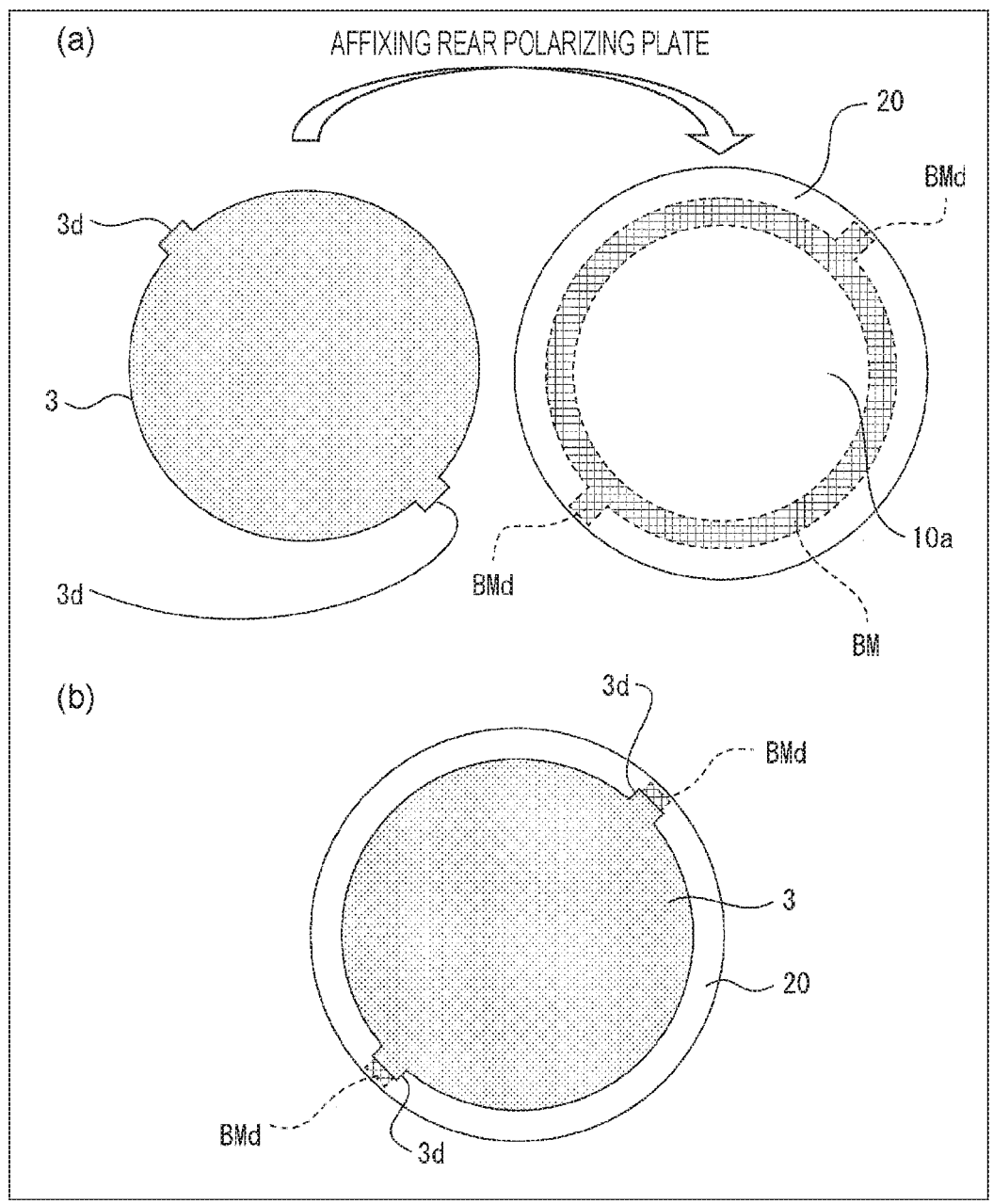
FIG. 12(a) illustrates a state in which a rear polarizing plate according to a fourth embodiment of the present invention is being affixed to a device substrate of a liquid crystal display panel.
FIG. 12(b) illustrates a state obtained after the rear polarizing plate has been affixed to the device substrate.

As illustrated in FIG. 12, the rear polarizing plate 3 may include two projection portions 3d projecting from the edge as viewed in a plan view, in place of the two recess portions 3a (see FIG. 2). In addition, a black matrix BM may include two projection portions BMd projecting from the edge as viewed in a plan view, in place of the recess portions BMa1 recessed from the edge and the island portions BMa2 (see FIG. 2).

Thus, the rear polarizing plate 3 is affixed to the device substrate 20 such that the positions of the two projection portions 3d provided on the edge of the rear polarizing plate 3 match the positions of the two projection portions BMd provided on the edge of the black matrix BM. In this manner, the rear polarizing plate 3 can be affixed to the device substrate 20 in optimal orientation and position.

FIG. 13(a) illustrates a state in which a front polarizing plate 4 according to the fourth embodiment of the present invention is being affixed to a counter substrate 11 of the liquid crystal display panel 10, and FIG. 13(b) illustrates a state obtained after the front polarizing plate 4 has been affixed to the counter substrate 11.

Figure 13:
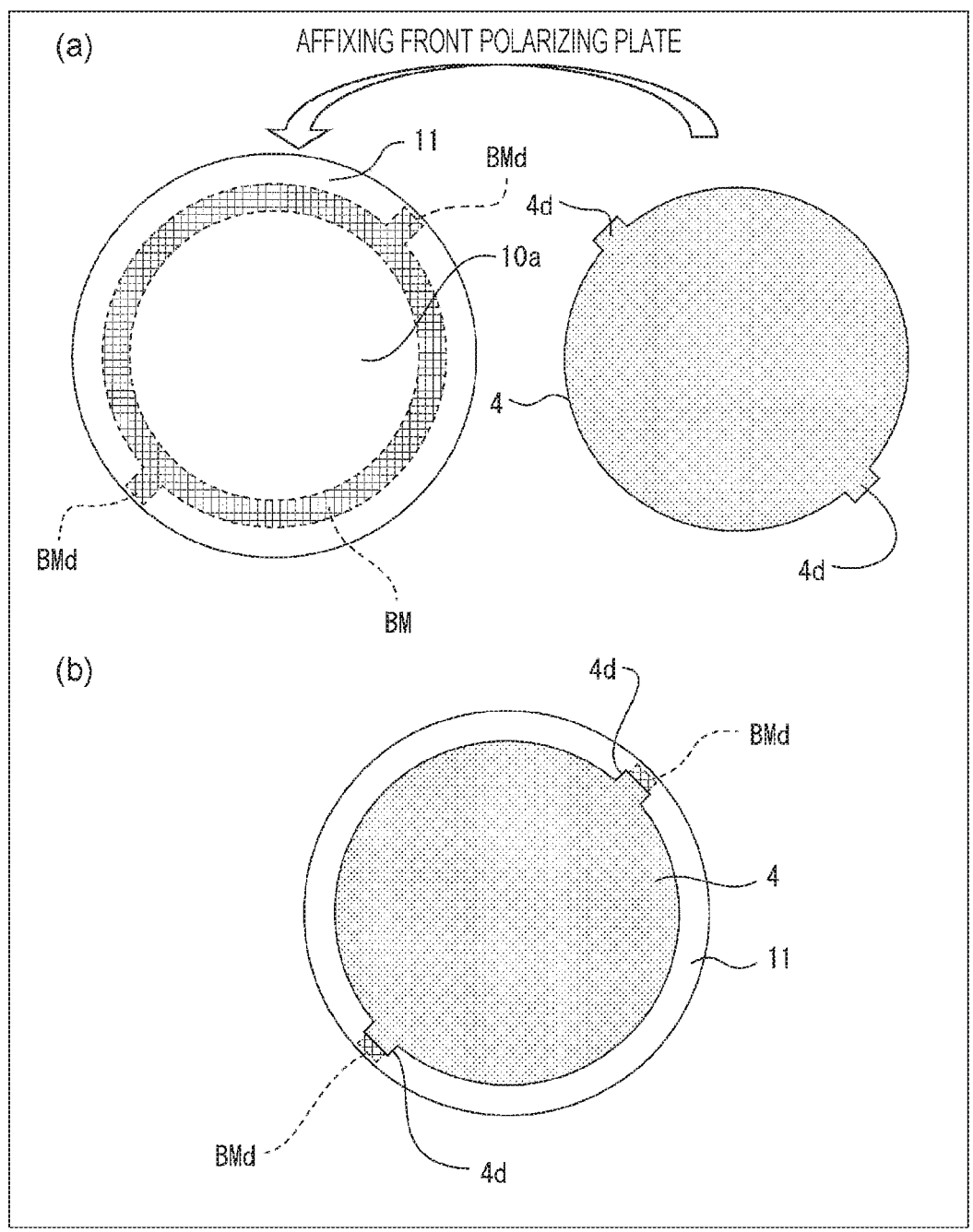
FIG. 13(a) illustrates a state in which a front polarizing plate according to the fourth embodiment of the present invention is being affixed to a counter substrate of the liquid crystal display panel.
FIG. 13(b) illustrates a state obtained after the front polarizing plate has been affixed to the counter substrate.

As illustrated in FIG. 13, the front polarizing plate 4 may include two projection portions 4d projecting from the edge as viewed in a plan view, in place of the two recess portions 4a (see FIG. 2).

Thus, the front polarizing plate 4 is affixed to the counter substrate 11 such that the positions of the two projection portions 4d provided on the edge of the front polarizing plate 4 match the positions of the two projection portions BMd provided on the edge of the black matrix BM. In this manner, the front polarizing plate 4 can be affixed to the counter substrate 11 in optimal orientation and position.

Recapitulation

A liquid crystal display panel 10 according to a first aspect of the present invention includes a black matrix BM that blocks light between pixels disposed in a matrix in an image display portion (display portion 10a); and a pair of polarizing plates (rear polarizing plate 3, front polarizing plate 4) disposed on respective outer side surfaces of two substrates (device substrate 20, glass substrate 12) sandwiching the black matrix BM, wherein at least two first shape portions (recess portion BMa1, island portion BMa2) are provided on an edge of the black matrix BM, the at least two first shape portions each being a shape that includes a recess portion recessed from the edge or a projection portion projecting from the edge, wherein at least two second shape portions (recess portions 3a, 4a) are provided in at least one of the pair of polarizing plates (rear polarizing plate 3, front polarizing plate 4), the at least two second shape portions each being a shape that includes a recess portion recessed from an edge of the polarizing plate or a projection portion projecting from the edge, and wherein, as viewed in a plan view, one of the at least two first shape portions (recess portion BMa1, island portion BMa2) and one of the at least two second shape portions (recess portions 3a, 4a) are disposed at positions that match each other, and another one of the at least two first shape portions (recess portion BMa1, island portion BMa2) and another one of the at least two second shape portions (recess portions 3a, 4a) are disposed at positions that match each other.

According to the above configuration, the at least two first shape portions are provided on the edge of the black matrix, the at least two first shape portions each being a shape that includes a recess portion recessed from the edge or a projection portion projecting from the edge. The at least two second shape portions are provided in at least one of the pair of polarizing plates, the at least two second shape portions each being a shape that includes a recess portion recessed from the edge of the polarizing plate or a projection portion projecting from the edge. One of the at least two first shape portions and one of the at least two second shape portions are disposed at positions that match each other. Furthermore, another one of the at least two first shape portions and another one of the at least two second shape portions are disposed at positions that match each other.

Therefore, it suffices that the polarizing plate be affixed to the substrate such that the at least two first shape portions provided on the edge of the black matrix match the second shape portions provided on the edge of the polarizing plate, and the polarizing plate can be affixed accurately in appropriate position and orientation.

Furthermore, to check whether the position, the orientation, and so on in which the polarizing plate is being affixed to the substrate are appropriate after the polarizing plate has been affixed to the substrate, it suffices to check whether the positions of the at least two first shape portions present as shapes on the edge of the black matrix match the positions of the at least two second shape portions present as shapes on the edge of the polarizing plate. Accordingly, it is possible to continue to check whether the position, the orientation, and so on in which the polarizing plate is being affixed to the substrate are appropriate even after the polarizing plate has been affixed to the substrate.

In addition, it suffices that the polarizing plate be affixed to the substrate such that the positions of the at least two first shape portions provided on the edge of the black matrix match the positions of the at least two second shape portions provided on the edge of the polarizing plate, and the polarizing plate can be affixed accurately in appropriate position and orientation.

Furthermore, it suffices that whether the positions of the at least two first shape portions match the positions of the at least two second shape portions can be checked, and whichever of the size of the polarizing plate and the size of the black matrix can be greater. Accordingly, a decrease in the design flexibility can be prevented.

In the liquid crystal display panel 10 according to a second aspect of the present invention, in the above first aspect, the liquid crystal display panel 10 may be circular. As described above, the at least two first shape portions are provided on the edge of the black matrix, and at least two second shape portions are provided on the edge of the polarizing plate. Therefore, even when the liquid crystal display panel 10 is circular, the polarizing plate can be affixed accurately in an appropriate orientation with respect to the substrate. Accordingly, a decrease in the optical performance that could arise if the orientation of the polarizing plate is not appropriate can be prevented.

In the liquid crystal display panel 10 according to a third aspect of the present invention, in the above first or second aspect, the at least two first shape portions (recess portion BMa1, island portion BMa2) and the at least two second shape portions (recess portions 3a, 4a) may be disposed in a peripheral portion 10b of the liquid crystal display panel 10, the peripheral portion 10b being a region outside the image display portion. According to this aspect, the two first shape portions and the at least two second shape portions are provided in the peripheral portion 10b in which no image is displayed, and thus a decrease in the image quality that could arise due to the two first shape portions and the at least two second shape portions can be prevented.

In the liquid crystal display panel 10 according to a fourth aspect of the present invention, in the above first to third aspects, the at least two first shape portions (recess portion BMa1, island portion BMa2) may be disposed symmetric about a center of the black matrix BM, and the at least two second shape portions (recess portions 3a, 4a) may be disposed symmetric about a center of the polarizing plate (rear polarizing plate 3, front polarizing plate 4) in which the at least two second shape portions (recess portions 3a, 4a) are provided. According to this aspect, the polarizing plate can be affixed easily to the substrate such that the positions of the at least two first shape portions match the positions of the at least two second shape portions. Therefore, the polarizing plate can be affixed to the substrate more accurately in an appropriate orientation.

In the liquid crystal display panel 10 according to a fifth aspect of the present invention, in the above first to fourth aspects, the at least two first shape portions (recess portion BMa1, island portion BMa2) may consist of two second shape portions, the at least two second shape portions (recess portions 3a, 4a) may consist of two second shape portions, and the two second shape portions (recess portions 3a, 4a) may be provided on the edge of each of the pair of polarizing plates (rear polarizing plate 3, front polarizing plate 4).

A display apparatus 1 according to a sixth aspect of the present invention may include the liquid crystal display panel 10 in the above first to fifth aspects.

REFERENCE SIGNS LIST

1 DISPLAY APPARATUS
10 LIQUID CRYSTAL DISPLAY PANEL
3 REAR POLARIZING PLATE
3a, 3b RECESS PORTION (SECOND SHAPE PORTION)
4a, 4b RECESS PORTION (SECOND SHAPE PORTION)
BMa1, BMc RECESS PORTION (FIRST SHAPE PORTION)
BMa2 ISLAND PORTION (FIRST SHAPE PORTION)
3d PROJECTION PORTION (SECOND SHAPE PORTION)
4c, 4d PROJECTION PORTION (SECOND SHAPE PORTION)
BMb, BMd PROJECTION PORTION (FIRST SHAPE PORTION)
4 FRONT POLARIZING PLATE (POLARIZING PLATE)
10a DISPLAY PORTION
10b PERIPHERAL PORTION
11 COUNTER SUBSTRATE (SUBSTRATE)
12 GLASS SUBSTRATE (SUBSTRATE)
15 LIQUID CRYSTAL
16 SEAL
20 DEVICE SUBSTRATE
21 CABLE
30 BACKLIGHT
50 CONTROL UNIT

The invention claimed is:

1. A liquid crystal display panel, comprising:
a black matrix that blocks light between pixels disposed in a matrix in an image display portion; and
a pair of polarizing plates disposed on respective outer side surfaces of two substrates sandwiching the black matrix, wherein
at least two first shape portions are provided on an edge of the black matrix, the at least two first shape portions each being a shape that includes a recess portion recessed toward a center of the black matrix from the edge of the black matrix or a projection portion projecting outwardly from the center of the black matrix from the edge of the black matrix,
at least two second shape portions are provided in at least one of the pair of polarizing plates, the at least two second shape portions each being a shape that includes a recess portion recessed toward a center of the least one of the pair of polarizing plates from an edge of the at least one of the pair of polarizing plates or a projection portion projecting outwardly from the center of the at least one of the pair of polarizing plates from the edge of the at least one of the pair of the polarizing plates, and
as viewed in a plan view,
one of the at least two first shape portions and one of the at least two second shape portions are disposed at positions that match each other, and another one of the at least two first shape portions and another one of the at least two second shape portions are disposed at positions that match each other.

2. The liquid crystal display panel according to claim 1, wherein the liquid crystal display panel is circular.

3. The liquid crystal display panel according to claim 1, wherein the at least two first shape portions and the at least two second shape portions are disposed in a peripheral portion of the liquid crystal display panel, the peripheral portion being a region outside the image display portion.

4. The liquid crystal display panel according to claim 1, wherein the at least two first shape portions are disposed symmetric about a center of the black matrix, and
wherein the at least two second shape portions are disposed symmetric about a center of the polarizing plate in which the at least two second shape portions are provided.

5. The liquid crystal display panel according to claim 1, wherein the at least two first shape portions consist of two first shape portions,
wherein the at least two second shape portions consist of two second shape portions, and wherein the two second shape portions are provided on the edge of each of the pair of polarizing plates.

6. A display apparatus, comprising: the liquid crystal display panel according to claim 1.

* * * * *